United States Patent [19]

Laithwaite et al.

[11] 4,300,871

[45] Nov. 17, 1981

[54] METHOD OF, AND APPARATUS FOR, EXTRACTING ENERGY FROM WAVES

[76] Inventors: Eric R. Laithwaite; Stephen H. Salter, both of c/o United Kingdom Atomic Energy Authority, 11 Charles II St., London SW1Y 4QP, England

[21] Appl. No.: 107,366

[22] Filed: Dec. 26, 1979

[51] Int. Cl.³ .............................................. F03B 13/12
[52] U.S. Cl. .................................... 417/331; 60/398; 60/497
[58] Field of Search ................................ 417/330–334, 417/337; 290/53, 54; 60/398, 495–507

[56] References Cited

U.S. PATENT DOCUMENTS 3,928,967 12/1975 Salter ..................................... 60/398
4,251,991 2/1981 Wood ............................... 60/497 X Primary Examiner—Allen M. Ostrager
Attorney, Agent, or Firm—William R. Hinds

[57] ABSTRACT

In a method of, and apparatus for, extracting energy from waves on a liquid, the precession of a gyroscope in response to angular motion of a member in response to waves performs useful work by operating a hydraulic pump.

Advantageously, pairs of gyroscopes having their rotors spinning in opposite directions are mounted in the member so as to balance the output torques of the gyroscopes.

8 Claims, 7 Drawing Figures

METHOD OF, AND APPARATUS FOR, EXTRACTING ENERGY FROM WAVES

BACKGROUND OF THE INVENTION

This invention relates to a method of, and apparatus for, extracting energy from waves on a liquid. Wave energy offers a potential source of power, and several differing apparatus and methods have already been devised in an attempt to produce from wave energy an economic alternative source of power to that provided by the use of fossil fuels, for example in the generation of electricity.

An article entitled "Power from the Waves" by M. B. Holland, appeared in the Chartered Mechanical Engineer, September 1978, published by the Institution of Mechanical Engineers, London, England, and examined the potential of wave power around the United Kingdom. Among the apparatus described in the article for extracting energy from waves were:

(1) The Salter Duck, the subject of British Pat. No. 1,482,085 (U.S. Pat. No. 3,928,967) which is incorporated by reference herein, and (2) The Cockerell Raft, the subject of British Pat. No. 1,448,204 which is also incorporated by reference herein.

Furthermore, a recent development in the field of wave energy extraction is the "Triplate" apparatus based on the ideas of Dr. J. F. Farley and Professor P. C. Parks of the Royal Military College of Science, Shrivenham, England, and described for example in New Scientist, Vol. 80, No. 1124, pp 113, Oct. 12th 1978 which is incorporated by reference herein. All the above apparatus utilise the motion of a member thereof in response to waves as a means of extracting energy from the waves, and one feature common to all these apparatus is that of the protection of the working parts, particularly the power producing parts, from the marine environment in which the apparatus is to be used during the working life of the apparatus.

SUMMARY OF THE INVENTION

The invention therefore in a first aspect provides an apparatus for extracting energy from waves on a liquid by the angular motion of a part of the apparatus in response to the waves, there being provided gyroscope means arranged to be subjected to the effect of said angular motion so as to cause precession of the gyroscope means, and means for performing useful work from the precession of the gyroscope means.

In another aspect the invention provides a method of extracting energy from waves on a liquid, the method comprising subjecting a gyroscope means to the effect of angular motion of a member in response to the waves, and performing useful work from the precession of the gyroscope means in response to said angular motion.

Preferably, the gyroscope means comprises an even number of gyroscope, pairs of said gyroscopes being adapted to spin in opposite relative directions so as to precess in opposite directions to each other.

Desirably, the work performing means comprises at least one ring cam hydraulic pump at each gyroscope for pressuring a hydraulic system, the gyroscope frame being connected to a respective pump body.

Acoustic transducer means may be included to sense the noise generated by the ring cam pump and thus the occurrence of a fault within the pump.

In order to smooth the pressure in the hydraulic system, auto-variable hydraulic motor means are desirably drivably connected to each gyroscope so as to drive the gyroscope when the pressure in the system exceeds a selected pressure, and to be driven by the gyroscope so as to pressurize the system when the pressure of the system falls below a selected pressure.

The hydraulic system may include hydraulic motor means arranged to drive an electric generator.

The gyroscope means of the invention may be incorporated inter alia in the aforesaid Salter Duck, Cockerell Raft, or Shrivenham "Triplate".

One advantage of the aforedescribed apparatus or method of the invention is that the power producing parts, i.e. the gyrsocope means and the work performing means, may be contained in an enclosure sealed from the environment and from that portion of the apparatus at which relative angular motion occurs without the need for a rotary or translational type of seal therethrough to take up the said angular motion.

BRIEF EXPLANATION OF THE DRAWINGS

The invention will now be described by way of example only with reference to the accompanying drawings in which.

DETAILED DESCRIPTION OF THE INVENTION

Figure 1:
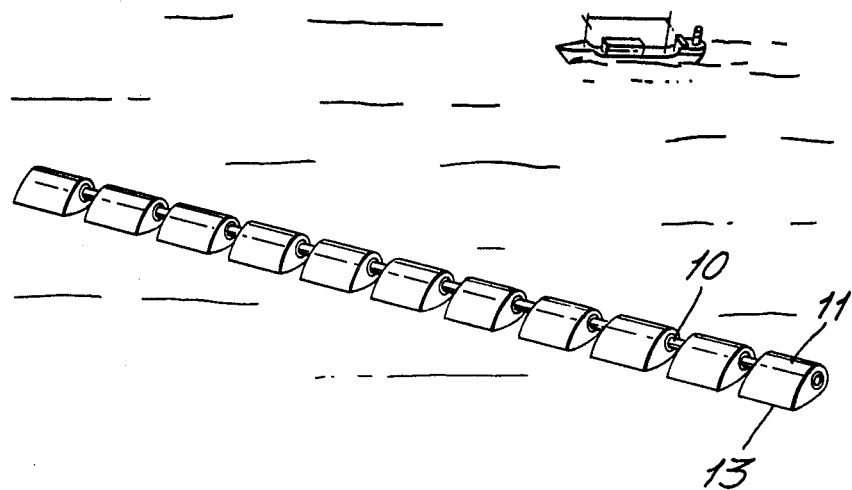
FIG. 1 shows a perspective representative of a string of Salter Ducks.
Figure 2:
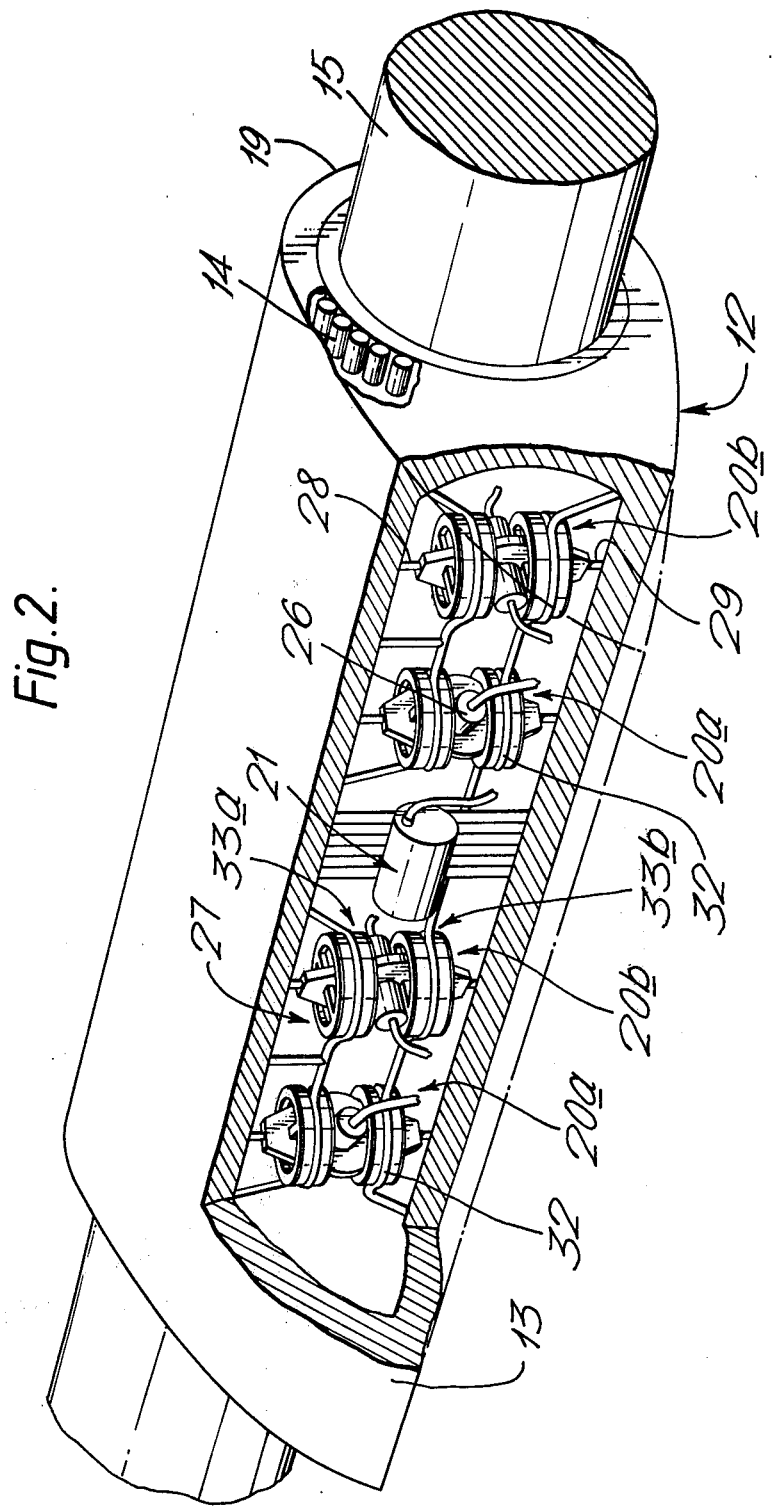
FIG. 2 shows to an enlarged scale a perspective cut-away representation of one of the Salter Ducks of FIG. 1.

Referring now to FIG. 1, a string of Salter Ducks 11 are shown on a common spine 10 in the sea and aligned broadside to the waves. Each Salter Duck 11 as shown in FIG. 2 comprises a pivotable member 12 shaped to define an enlarged hollow beak portion 13 which is pivotable by means of bearings 14 about a portion 15 of the spine 10 and is sealed from the marine environment. The rear portion 19 of the Salter Duck 11 is circular so as to minimise energy transfer between the rear portion 19 and the waves.

Figure 3:
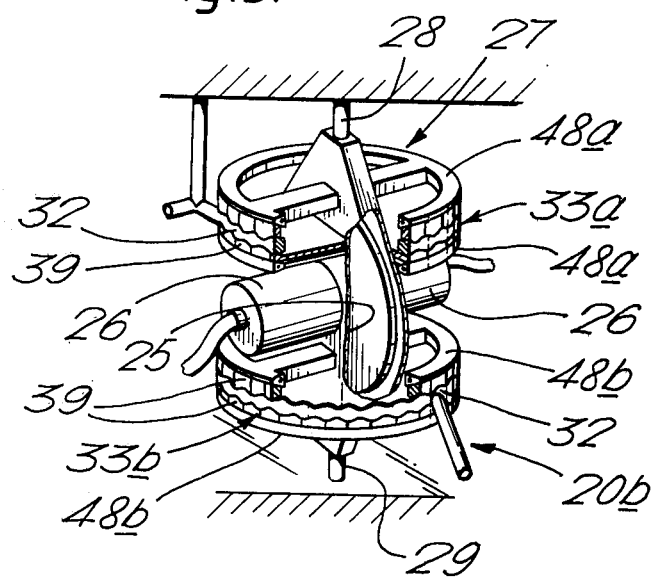
FIG. 3 shows to an enlarged scale a cut-away perspective representation of part of the Salter Duck of FIG. 2.

Four gyroscope assemblies arranged in two pairs of gyroscope assemblies 20a, 20b, are mounted in the beak portion 13, each assembly 20a, 20b being pivotable about an axis substantially perpendicular to the direction of the spine portion 15, and a hydraulic motor 3-phase electric alternator assembly 21 is mounted midway between the pairs of gyroscope assemblies 20a, 20b. As shown in more detail in FIG. 3, each gyroscope assembly 20a and 20b, comprises a disc-like rotor 25 drivably connected at each side thereof to an auto-variable swashplate-type hydraulic motor 26. The rotor 25 is rotatably held in a mounting 27 which is pivotably mounted in the body of the Salter Duck 11 at 28, 29 along an axis perpendicular to the spin axis of the rotor 25. Cam shaped discs 32 of respective ring cam pumps 33a, 33b are rigidly supported one above the other from the body of the Salter Duck 11 and engage on each side thereof respective rollers 39 each mounted as shown in FIG. 4 on a link 42 pivoted at 44 and pivotally connected to a rod 45 extending from a piston 46 moving in a cylinder 47 which discharges into ring-shaped manifolds 48a, 48b in the mounting 27.

Figure 4:
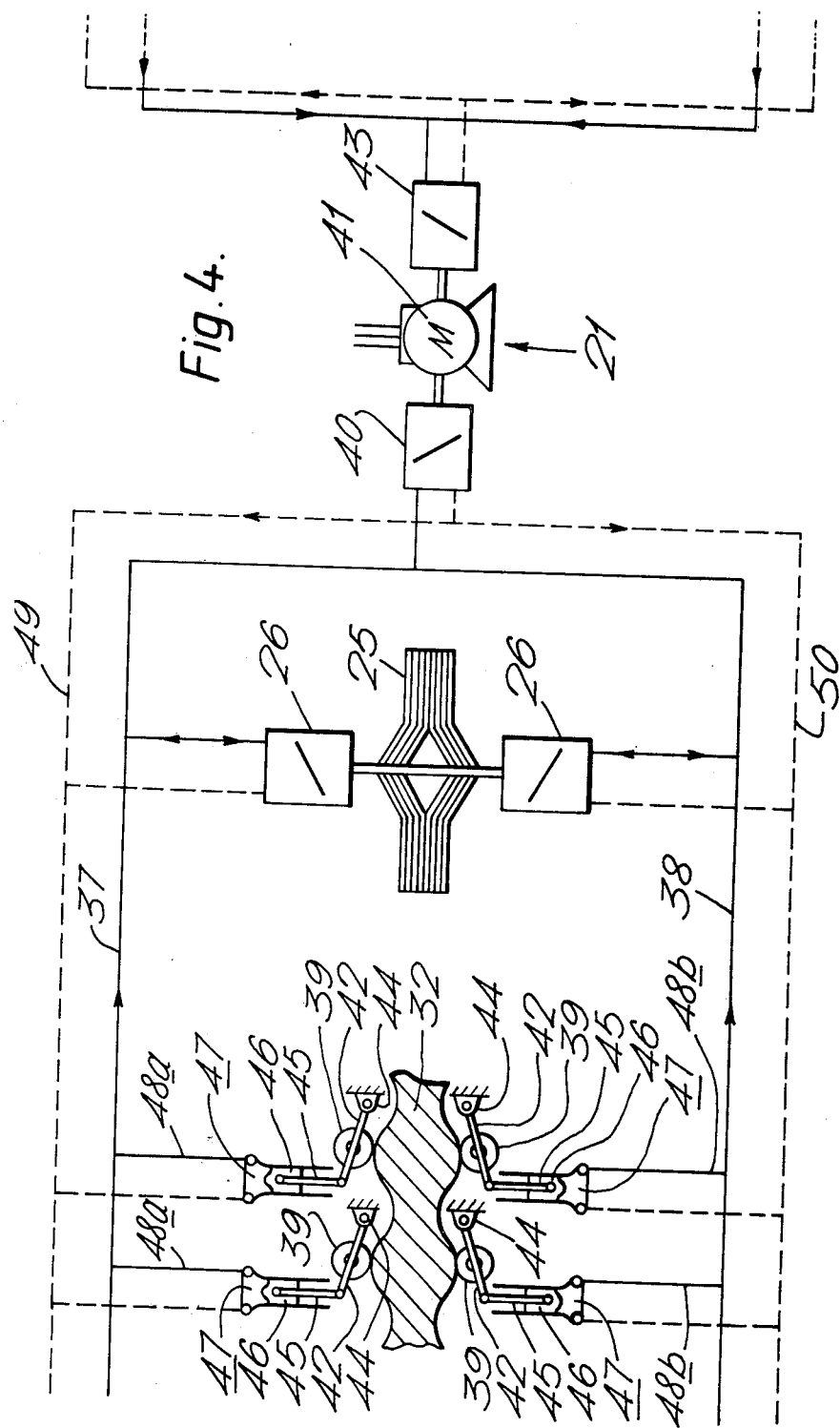
FIG. 4 shows a schematic representation of the power take-off system for the Salter Duck of FIG. 2.

As shown in FIG. 4, the manifolds 48a, 48b, of one of the gyroscope assemblies 20a or 20b discharge into high pressure mains 37, 38 respectively connected in parallel to a swashplate type hydraulic motor 40 of the hydraulic motor/alternator assembly 21, the motor 40 being drivably connected to one side of a 3-phase electric alternator 41 of the assembly 21. The other manifolds 48a, 48b, of the other pair of gyroscope assemblies 20b or 20a are similarly connected to high pressure mains (not shown) connected in parallel to a swashplate-type hydraulic motor 43 of the assembly 21 and drivably connected to the other side of the alternator 41. The hydraulic motors 26 are connected in parallel across the high pressure mains 37, 38, and low pressure mains 49, 50 form the return path of the system of FIG. 4.

In operation, the rotors 25 are set spinning with the rotors 25 of a pair of gyroscope assemblies 20a, 20b spinning in opposite directions, and when the beak portion 13 of the Salter Duck 11 pivots about the spine portion 15 in response to waves, the gyroscope assemblies 20a, 20b precess in opposite directions about the pivotal mountings 28, 29, and cause the pistons 46 of the ring cam pumps 33a, 33b, to be operated by the lobes of the cam-shaped discs 32 engaging the rollers 39. The high pressure mains 37, 38 are thus energised by the ring cam pumps 33a, 33b and drive the hydraulic motors 40, 43, which thus drive the alternator 41. If the pressure in the high pressure mains 37, 38 rises above a mean value as a result of a burst of wave energy, the angular deflection of the swash plates on the hydraulic motors 26 increases so as to allow the extra energy to speed up the rotors 25. If the pressure in the high pressure mains 37, 38 is at a mean value, the swash plates in the hydraulic motors 26 move to their zero displacement angle and all the oil in the high pressure mains 37, 38 flows to the hydraulic motors 40. If during a lull in the wave pattern on the surface there is less oil from the pumps 33a, 33b than is necessary to maintain a required pressure in the high pressure mains 37, 38, the swash plates in the hydraulic motors 26 open and draw the energy deficit from the rotors 25.

As the gyroscope assemblies 20a, 20b of a pair precess in opposite directions, the output torques thereof are in opposite directions and are absorbed in the beak portion 13 without having any significant effect on the spine portion 15 of the Salter Duck 11.

The lobes on the cam-shaped discs 32 are shown as being on the sides normal to the respective pump 33a, 33b axis, but the lobes may be defined along circumferential surfaces of the cam-shaped discs 32. Ring cam pumps may be obtained from Messrs MacTaggart-Scott, Poclain, and from Häggelund.

Each cylinder 47 may have an electronically controlled poppet valve (not shown) so that the decision about which poppet valves are to open may be made by a computer to which information is fed such as the Duck's pivotal angle, angular velocity, pressure field, recent history of power levels, rotor speed and precession angle of the gyroscope assembly, condition of the power take-off system, and the deflections of the spine of the string of Ducks. The poppet valves may also be used to isolate a cylinder having a defective piston or roller which has been detected by an acoustic transducer.

Although the invention has been described in relation to a Salter Duck, it may be incorporated in other apparatus, for example of the Cockerell Raft, and the Shrivenham Triplate.

Figure 5:
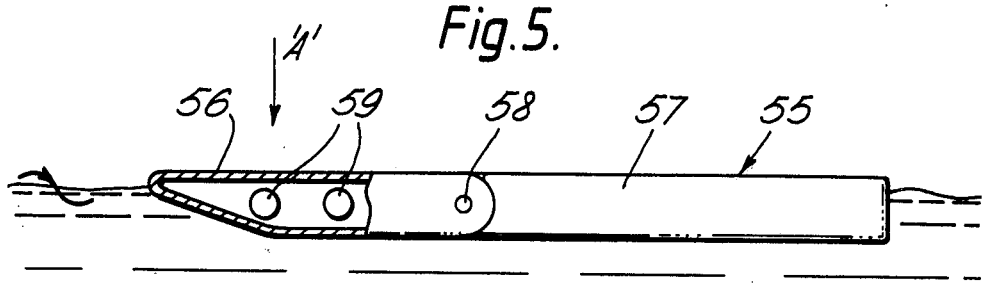
FIG. 5 shows a side diagrammatic representation of a Cockerell Raft.
Figure 6:
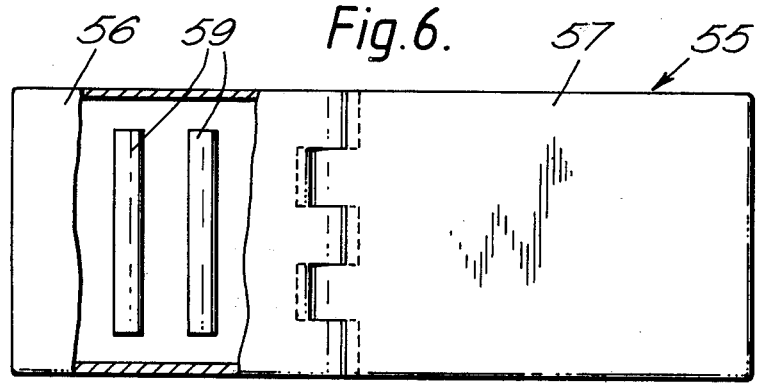
FIG. 6 shows a view in the direction of arrow 'A' of FIG. 5.

Referring to FIGS. 5 and 6, a representation of a Cockerell Raft 55 is shown having a leading pontoon 56, and a rear pontoon 57 hingedly connected at 58. Two arrangements of gyroscope assemblies 59 and a power take-off system similar to those described in relation to FIGS. 1 to 4 are installed in the leading pontoon 55 so that when the leading pontoon 55 pivots about the hinge connection 58, electric power is produced in a similar manner to that produced by the angular pivotal motion of the beak portion 13 of the Salter Duck 11 of FIGS. 1 to 4.

Figure 7:
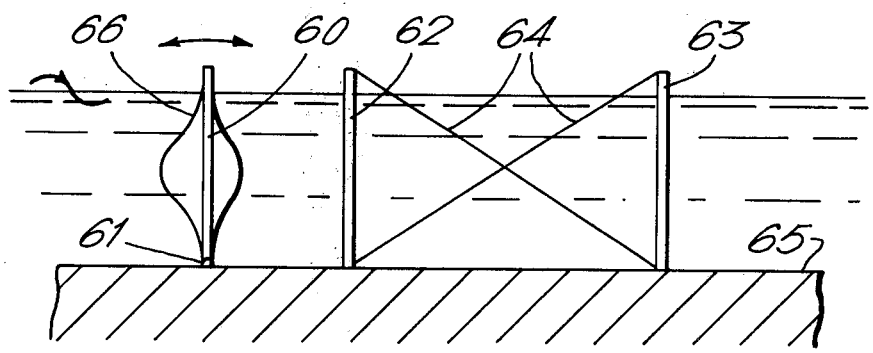
FIG. 7 shows a side diagrammatic representation of a Shrivenham Triplate apparatus.

In the representation of the Shrivenham Triplate of FIG. 7, a front plate 60 pivoted at 61 is positioned in front of two fixed plates 62, 63 respectively which are braced by diagonal ties 64. The plates 60, 62, 63 are mounted on a buoyant member 65 which is arranged to present the plates 60, 62, 63 just above the mean wave height and parallel to each other normal to the incident wave direction. The fixed plates 62, 63 are spaced half a wavelength at the optimum conditions for which the Triplate is designed, and the front plate 60 and the fixed plate 62 are spaced apart by a quarter of this wavelength. An arrangement of gyroscope assemblies 66 and a power take-off system similar to those described in relation to FIGS. 1 to 4 are mounted on the front plate 60.

In operation the resonant wave between the fixed plates 62, 63, forms a reference frame, and the incoming wave is fully reflected by the fixed plate 62 so that the front plate 60 is at the point of maximum horizontal motion. Thus the front plate 60 pivots about 61 and electric power is produced from this angular motion in a similar manner to that produced from the angular pivotal motion of the beak portion 13 of the Salter Duck 11 of FIGS. 1 to 4.

It will be understood that the invention may be incorporated in other apparatus for extracting energy from waves from the angular motion of a member in response to the waves.

It will also be appreciated that although a ring cam pump is preferred, other suitable hydraulic pumps might be used, or alternative work performing means arranged to be energised from the precession of the gyroscopes.

If desired, a single or an uneven number of gyroscopes might be used although the balanced output of an even number of gyroscopes is preferred.

In order to minimise losses by windage it is desirable for the rotors of the gyroscope assemblies to rotate in a reduced pressure, partial vacuum environment.

We claim:

1. An apparatus for extracting energy from waves on a liquid by use of the angular motion of a part of the apparatus in response to the waves, wherein the improvement comprises, at least one gyroscope means arranged to be subjected to the effect of said angular motion so as to cause precession of the gyroscope means, and means for performing useful work from the precession of the gyroscope means.

2. An apparatus as claimed in claim 1, including an even plurality of said gyroscope means, pairs of said gyroscope means having rotors thereof adapted to spin in opposite relative directions so as to cause precession of the said gyroscope means of a said pair in opposite directions to each other in response to the same angular motion of said part.

3. An apparatus as claimed in claim 1, wherein the work performing means comprises,
 (a) a hydraulic pump means arranged to be driven by the precession of the gyroscope means;
 (b) a hydraulic circuit connected to the hydraulic pump means so as to be pressurized by the hydraulic pump means; and
 (c) a hydraulic motor connected to the hydraulic circuit so as to be driven by the hydraulic circuit.

4. An apparatus as claimed in claim 3, including autovariable swashplate hydraulic motor means connected in parallel to the hydraulic circuit, and a rotor of the gyroscope means to which the auto-variable motor is drivably connected.

5. An apparatus as claimed in claim 1, including an enclosure sealed from the marine environment and in which the gyroscope means is located.

6. An apparatus for extracting energy from sea waves by use of the angular motion of a part of the apparatus in response to waves, wherein the improvement comprises,
 (a) an enclosure sealed from the marine environment is said part;
 (b) at least one gyroscope means in said enclosure, the gyroscope means being pivotable about an axis substantially parallel to the direction of the angular motion of said part and having an axis of spin of the rotor thereof substantially perpendicular to said pivotal axis;
 (c) ring cam pump means, one above and one below the rotor of the gyroscope means, each said ring cam pump means comprising a ring cam portion rigidly connected to the apparatus and a ring pump rigidly connected to the gyroscope means one above and one below the ring cam portion so as to turn with the gyroscope means around the ring cam portion and be operated by said ring cam portion;
 (d) a hydraulic circuit in said enclosure and connected to each ring cam pump means so as to be energised by said ring cam pump means;
 (e) an auto-variable swashplate hydraulic motor means mounted one each side of the rotor of the gyroscope means and rotatably connected thereto, each said auto-variable hydraulic motor means being connected in parallel to the hydraulic circuit, thereby to increase in speed when the hydraulic pressure in the hydraulic circuit is above a first selected value and thus drive the rotor so as to increase the speed of rotation of the rotor and be driven by the rotor when the pressure in the hydraulic circuit is below a second selected value so as to pressurize the hydraulic circuit;
 (f) an output hydraulic motor in said enclosure and connected in series with the hydraulic circuit so as to be driven by the hydraulic circuit; and
 (g) an electric motor in said enclosure and drivably connected to the output hydraulic motor.

7. An apparatus as claimed in claim 6, wherein an even plurality of said gyroscope means are provided in said enclosure, pairs of said gyroscope means having rotors thereof arranged to spin in opposite relative directions, and each said gyroscope means having a said ring cam pump means one above and one below the rotor of said each gyroscope means.

8. A method of extracting energy from waves on a liquid by use of the angular motion of part of an apparatus thereon, the method comprising subjecting a gyroscope means to be effect of said angular motion to cause precession of the gyroscope means, and operating from said precession of the gyroscope means a means for performing useful work.

* * * * *